United States Patent
Hull et al.

(10) Patent No.: US 7,896,404 B2
(45) Date of Patent: Mar. 1, 2011

(54) TUBULAR REDUCER FITTING FOR ELECTRICAL NONMETALLIC TUBING

(75) Inventors: Eric G. Hull, Madison, OH (US); Gregory D. Turcovsky, Mentor, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 1303 days.

(21) Appl. No.: 10/903,197

(22) Filed: Jul. 30, 2004

(65) Prior Publication Data
US 2006/0022461 A1   Feb. 2, 2006

(51) Int. Cl.
*F16L 55/00* (2006.01)
*F16L 11/118* (2006.01)

(52) U.S. Cl. .................. 285/149.1; 285/148.23; 285/319

(58) Field of Classification Search ............. 285/148.23, 285/149.1, 151.1, 154.1, 319, 921; 174/65 R
See application file for complete search history.

(56) References Cited

U.S. PATENT DOCUMENTS

| | | | |
|---|---|---|---|
| 4,032,178 A * | 6/1977 | Neuroth ............... 285/154.2 |
| 4,214,586 A * | 7/1980 | Mericle ................ 606/154 |
| 4,679,827 A * | 7/1987 | Law ..................... 285/151.1 |
| 4,711,472 A * | 12/1987 | Schnell ................ 285/149.1 |
| 4,989,905 A * | 2/1991 | Rajecki ................ 285/319 |
| 5,094,482 A * | 3/1992 | Petty et al. ........... 285/319 |
| 5,204,499 A * | 4/1993 | Favalora .............. 174/65 R |
| 5,312,138 A * | 5/1994 | Patera et al. ......... 285/12 |
| 5,332,270 A * | 7/1994 | Petty et al. ........... 285/319 |
| 5,346,264 A * | 9/1994 | Law et al. ............ 285/136.1 |
| 5,422,437 A * | 6/1995 | Schnell ................ 174/65 R |
| 5,984,375 A * | 11/1999 | Merrett ................. 285/253 |
| 6,082,782 A * | 7/2000 | Bartholoma et al. .. 285/140.1 |
| 6,555,750 B2 * | 4/2003 | Kiely ................... 174/65 R |
| 6,616,194 B1 * | 9/2003 | Gretz .................. 285/151.1 |
| 6,637,780 B2 * | 10/2003 | Miyajima et al. .... 285/305 |
| 6,767,032 B1 * | 7/2004 | Gretz .................. 285/151.1 |
| 2004/0119285 A1 * | 6/2004 | Foos .................... 285/319 |
| 2006/0022462 A1 * | 2/2006 | Hull et al. ............ 285/319 |

\* cited by examiner

Primary Examiner — J M Hewitt
(74) Attorney, Agent, or Firm — Jones Day

(57) ABSTRACT

A tubular reducer fitting for transitioning from an existing electrical nonmetallic tubing socket of one size to an electrical nonmetallic tubing socket of a smaller size. The male end portion has a cylindrical outer surface with a pair of axially-spaced projections extending outwardly therefrom and is receivable in an existing electrical nonmetallic tubing socket. The female end portion has an electrical nonmetallic tubing socket therein. The male end portion is configured for locking reception in a first trade size electrical nonmetallic tubing socket and the opposite female connector end portion has a smaller trade size electrical nonmetallic tubing socket herein.

16 Claims, 3 Drawing Sheets

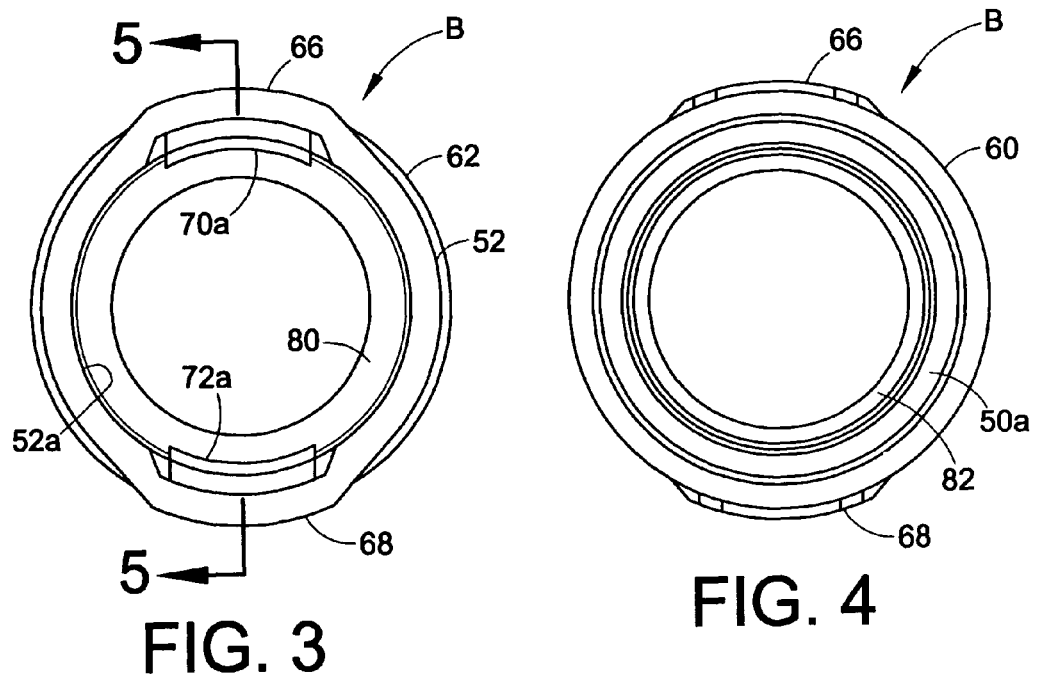
FIG. 3
FIG. 4
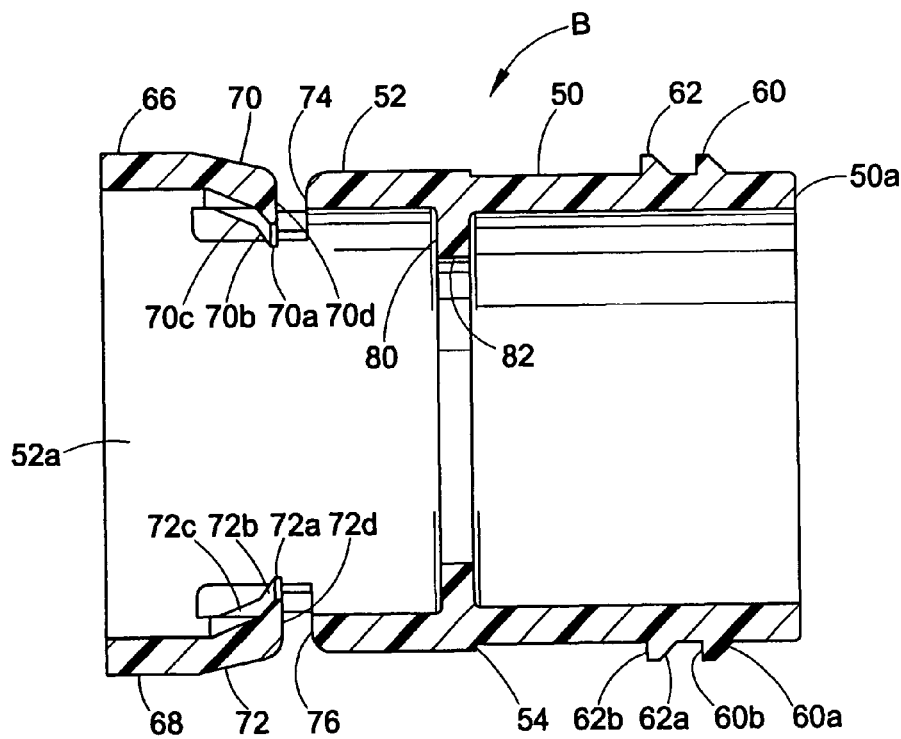
FIG. 5

# TUBULAR REDUCER FITTING FOR ELECTRICAL NONMETALLIC TUBING

BACKGROUND

This application relates to the art of electrical fittings and, more particularly, to an electrical fitting in the form of a male to female reducer having a barbed male end portion and an opposite end portion with a female socket therein for receiving an end portion of an electrical conduit. The application particularly concerns reducer fittings for transitioning from an existing ENT socket of one size to an ENT socket of a smaller size. However, it will be appreciated that certain features of the fitting may be used for other purposes.

SUMMARY

A fitting for electrical conduit is molded in one-piece of plastic material and has a barbed male end portion and a female socket on its opposite end portion.

The barbed male end portion has a pair of longitudinally-spaced circumferential rings projecting outwardly therefrom for cooperation with latch fingers on a female ENT socket.

A first of the rings on the barbed male end portion forms a barrier to block flow of concrete toward the end of the male end portion when the second ring is in locking engagement with a pair of opposite latch fingers on an ENT socket.

The female socket on the fitting is configured for receiving a corrugated ENT tube, and is provided with opposed latch fingers for latching with a circumferential groove in the exterior of the corrugated ENT tube.

BRIEF DESCRIPTION OF THE DRAWING

FIG. 3 is an end elevational view thereof;

FIG. 4 is an end elevational view of the opposite end thereof;

FIG. 5 is a cross-sectional elevational view taken generally on line 5-5 of FIG. 3;

DESCRIPTION OF EMBODIMENTS

Figure 1:
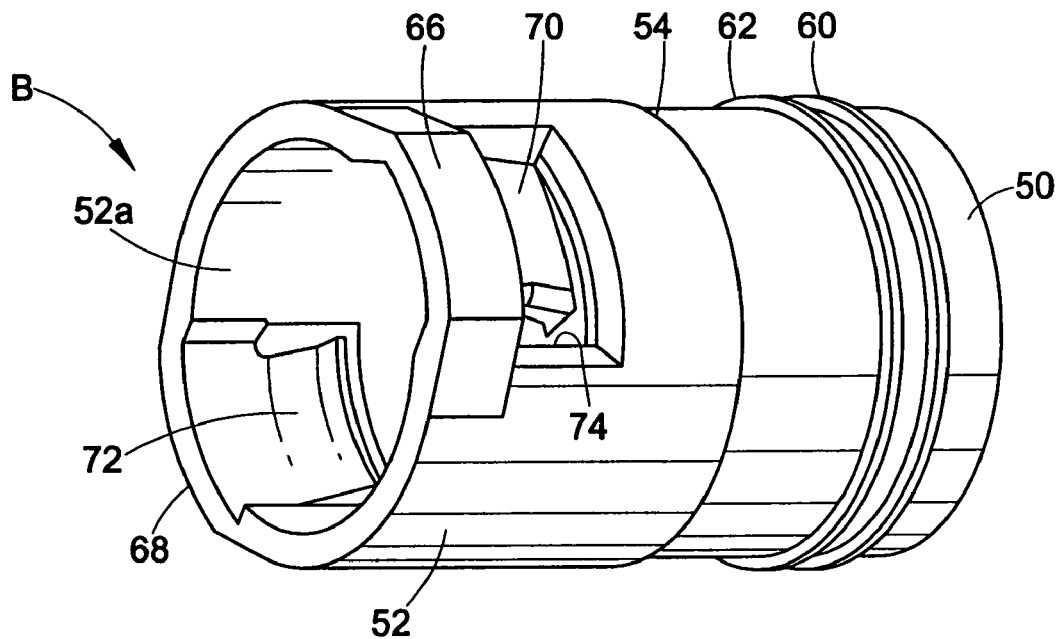
FIG. 1 is a perspective illustration of a fitting in accordance with the present application.

In this application, ENT is an acronym for electrical nonmetallic tubing of the type formed by a flexible corrugated tube that is made of plastic material such as PVC.

Referring now to the drawings, wherein the showings are for purposes of illustrating representative embodiments only and not for purposes of limiting same, FIGS. 1-5 show a tubular reducer fitting B is that molded in one-piece of plastic material for transitioning from an existing ENT socket of one size to an ENT socket of a smaller size. Fitting B has a generally cylindrical barbed male end portion 50 and a generally cylindrical female connector portion 52 that intersect at an outwardly extending circumferential radial shoulder 54.

Male and female end portions 50, 52 have generally cylindrical inner surfaces and the inner surface of male end portion 50 has a smaller diameter than the inner surface of female end portion 52.

Figure 2:
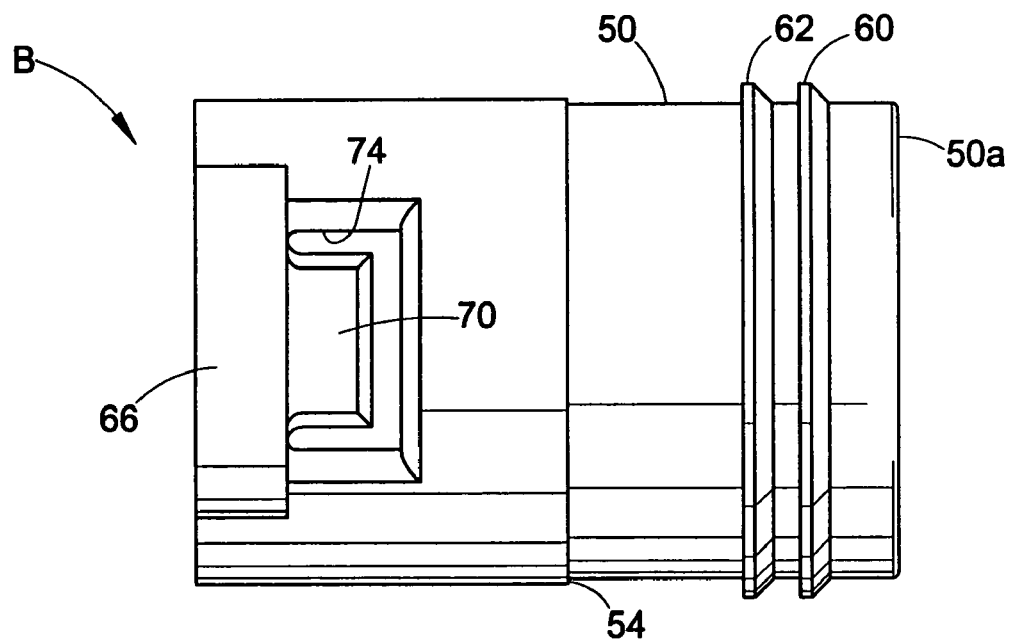
FIG. 2 is a side elevational view thereof.

Barbed male end portion 50 has a terminal end 50a, and a pair of longitudinally-spaced outwardly projecting circumferential rings 60, 62. Each ring 60, 62 has an inclined cam surface 60a, 62a facing toward end 50a and a radial surface 60b, 62b facing toward shoulder 54. Cam surfaces 60a, 60b are inclined at 45° to the outer surface of male end portion 50. Second ring 62 is located between shoulder 54 and first ring 60 that is located closest to end 50a. The rings 60, 62 are spaced from one another by an outer cylindrical portion of the outer cylindrical surface of male end portion 50 from which they project as shown in FIGS. 2 and 5.

Female connector 52 has a generally cylindrical ENT socket 52a therein for receiving an end portion of an ENT tube. Opposite arcuate latch finger supports 66, 68 bulge outwardly from the cylindrical peripheral wall of female connector 52 adjacent the open end thereof and support resilient latch fingers 70, 72 that project into opposite openings 74, 76 in the peripheral wall of female connector 52. Each opening 74, 76 is generally U-shaped around a finger as shown for opening 74 and finger 70 in FIG. 6.

Each resilient latch finger 70, 72 has a hook end portion 70a, 72a that projects inwardly of the inner peripheral surface of socket 52a. Intersecting cam surfaces 70b, 70c, 72b, 72c face toward the open end of socket 52a for engaging the end of an ENT tube as it is inserted into socket 52a for camming latch fingers 70, 72 outwardly so that the externally corrugated ENT tube can ratchet past hook end portions 70a, 72a.

The end of the ENT tube engages a shoulder 80 on an inwardly extending circumferential divider 82 between barbed male connector end portion 50 and female ENT socket end portion 52, and latch finger hook end portions 70a, 72a are received in an external circumferential groove in the corrugated ENT tube. Radial surfaces 70d, 72d on the latch fingers then engage a radial groove sidewall on the ENT tube when a pulling force is applied tending to remove the tube from socket 52a. This causes resilient latch fingers 70, 72 to bend inwardly for more firmly holding the ENT tube within the socket.

A radial surface on divider 82 that faces toward male end portion 50 is aligned with shoulder 54.

Figure 6:
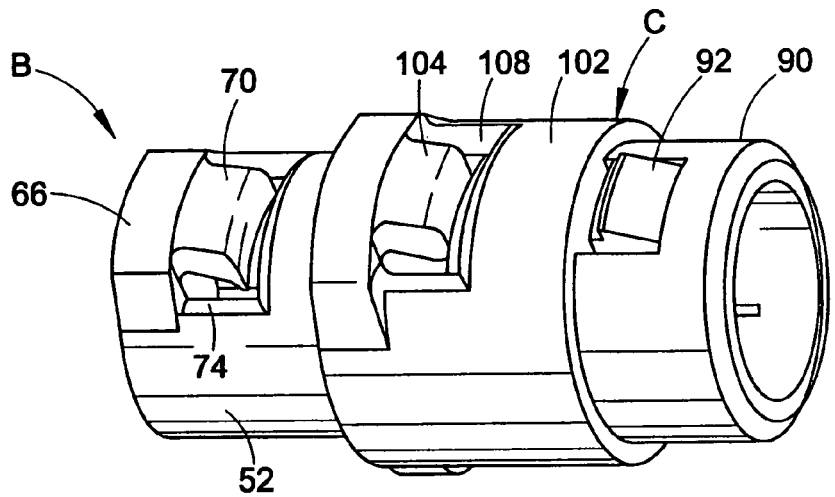
FIG. 6 is a perspective illustration of the fitting of FIGS. 1-5 combined with a snap-in ENT adapter.
Figure 7:
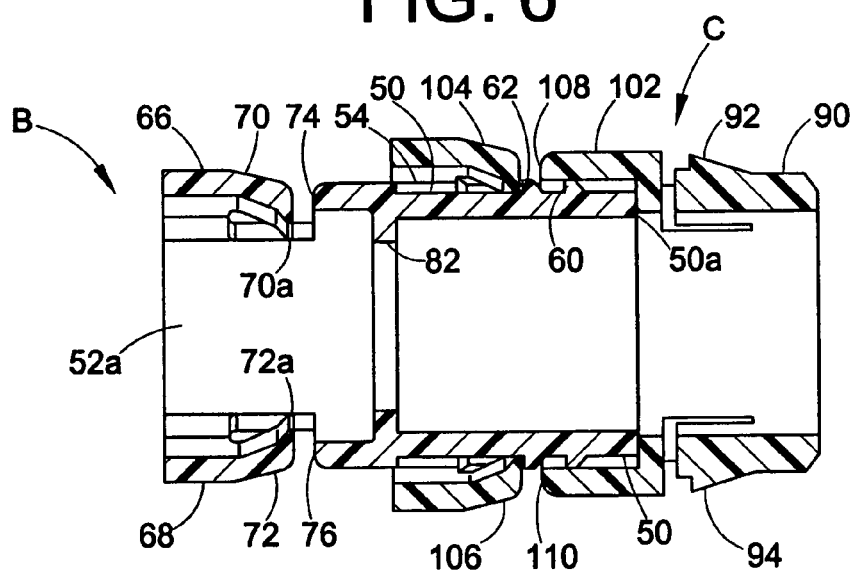
FIG. 7 is a cross-sectional elevational view of the fitting of FIGS. 1-5 combined with an ENT adapter.
Figure 8:
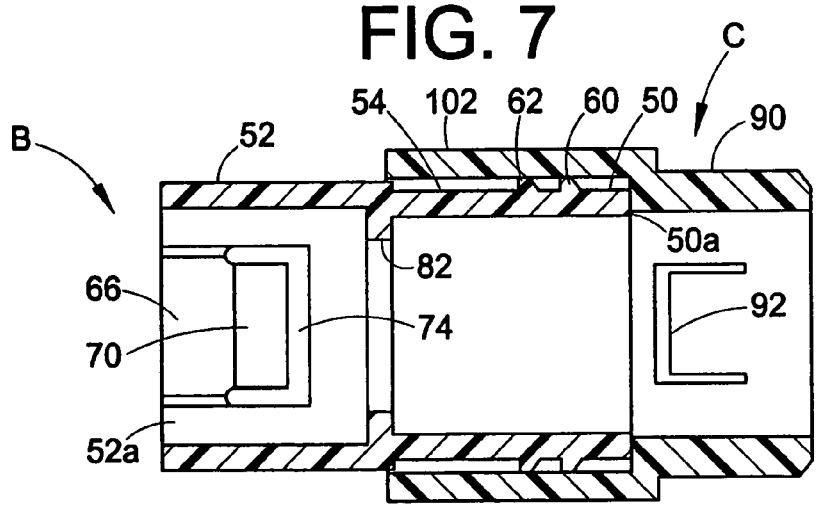
FIG. 8 is a cross-sectional elevational view similar to FIG. 7, but taken 90° from the section of FIG. 7.

FIGS. 6-8 show a snap-in ENT adapter C having a cylindrical male end portion 90 and a pair of resilient opposite snap fingers 92, 94. Cylindrical end portion 90 is closely receivable through a circular hole in the wall of an outlet box or the like, and snap fingers 92, 94 snap through the hole for securing adapter C to the box wall. Adapter C has a female ENT socket portion 102 that has the same configuration as described with reference to reducer fitting B. Thus, ENT socket 102 has opposite resilient latch fingers 104, 106 that are the same as latch fingers 70, 72 and project into opposite openings 108, 110 in the peripheral wall of ENT socket 102.

Male end portion 50 on reducer fitting B is receivable in socket 102 on adapter C as shown in FIGS. 7 and 8, and ring 62 is shown locked behind latch fingers 104, 106 to prevent removal of male end portion 50 from within socket 102. Openings 108, 110 in the peripheral wall of socket 102 normally provide a possible path for entry of poured concrete into socket 102 where it may flow along the clearance between the inner peripheral wall of the socket and the outer peripheral surface of male end portion 50 to enter the passage within the fittings.

In the configuration of the present application, ring projection 60 provides a barrier against the flow of concrete through openings 108, 110 to the interior of the fittings. Thus, ring projection 60 can have other configurations and does not require the same size and configuration as ring projection 62 as shown in the drawings when it is used solely as a barrier against the flow of concrete.

Sockets 102 may be of different depths, and ring projection 60 performs the same locking function as ring projection 62 when used with a shallower socket. In a shallower socket, ring projection 60 locks behind latch fingers 104, 106 and ring projection 62 is on the opposite side of latch fingers 104, 106 from the position shown in FIG. 6. In that configuration, an additional projecting ring that forms a barrier against flow of concrete may be provided between ring projection 60 and the terminal end of male end portion 50.

It will be recognized that female socket 102 may be on a threaded adapter or on a socket that is molded integrally with a box sidewall instead of being on a snap-in adapter. Fitting B is configured for transitioning from one size of ENT socket to the next smaller size. For example, socket 102 may be configured for receiving a one inch trade size ENT tube while it is desired or necessary to use three-quarter inch trade size ENT tube. Male end portion 50 is configured for locking reception within the one inch ENT socket while ENT socket 52a on fitting B is configured for locking reception of an end portion of a three-quarter inch corrugated ENT tube therein. Fitting B may be configured for transitioning from three-quarter inch to one-half inch and other sizes as well.

Socket 52a in fitting B is configured for receiving either a one-half inch or a three-quarter inch trade size ENT tube. It will be recognized that other sizes also can be provided. One-half inch trade size ENT tubing has an outside diameter of 0.832-0.848 inches. Three-quarter inch trade size ENT tubing has an outside diameter of 1.040-1.060 inches. One inch trade size ENT tubing has an outside diameter of 1.305-1.325 inches.

The length of male end portion 50 of fitting B from terminal end 50a to shoulder 54 is not critical because shoulder 54 is so small that it passes into a conventional trade size ENT socket. However, when shoulder 54 is radially larger so that it will not pass into a conventional ENT socket, the length of male end portion 50, from shoulder 54 to terminal end 50a is approximately 0.940 inches.

Radial rear surface 60b on ring projection 60 is spaced approximately 0.260 inches from terminal end 50a. Radial rear surface 62b on ring projection 62 is spaced approximately 0.410 inches from terminal end 50a. Thus, projections 60, 62 are located much closer to terminal end 50a than to shoulder 54 and extend at least 0.045 inches outwardly from the cylindrical outer surface of male end portion 50. The cylindrical outer surface of each projection 60, 62 is 0.025 inches wide.

Although the improvements of this application have been shown and described with reference to a representative embodiment, it is obvious that alterations and modifications will occur to others skilled in the art upon the reading and understanding of this disclosure. Therefore, it is to be understood that the improvements may be practiced otherwise than as specifically described herein while remaining within the scope of the claims.

What is claimed is:

1. Apparatus for transitioning from an existing electrical nonmetallic tubing socket of one size to an electrical nonmetallic tubing socket of a smaller size, the existing socket having latch fingers for reception in an external circumferential groove of a first electrical nonmetallic tube that is closely receivable in the existing socket for locking reception therein, said apparatus comprising:
   a reducer fitting having generally cylindrical male and female opposite end portions;
   said male end portion having a cylindrical outer surface and a terminal end;
   a shoulder extending outwardly from said outer surface between said male and female end portions;
   a pair of axially-spaced first and second circumferential projections extending outwardly from said outer surface intermediate said terminal end and said shoulder;
   said second projection being located between said first projection and said shoulder;
   at least said second projection having a sloping cam surface that slopes outwardly from said outer surface in a direction away from said terminal end;
   said female end portion having a generally cylindrical electrical nonmetallic tubing socket therein that is smaller than the existing socket for receiving an end portion of a second electrical nonmetallic tube that is smaller than the first electrical nonmetallic tube;
   said male end portion being configured for locking reception in the existing electrical nonmetallic tubing socket by way of cooperation between at least one of said projections and the latch fingers on the existing socket; and
   said electrical nonmetallic tubing socket on said fitting being one size smaller than the existing electrical nonmetallic tubing socket.

2. The fitting of claim 1 wherein said first projection has a sloping cam surface that slopes outwardly from said outer surface in a direction away from said terminal end and said first and second projections are spaced from one another by an outer cylindrical portion of said cylindrical outer surface on said male end portion.

3. The fitting of claim 1 wherein both of said projections have the same configuration and size.

4. The fitting of claim 1 wherein said electrical nonmetallic tubing socket on said fitting has a peripheral wall; resilient latch fingers projecting into said electrical nonmetallic tubing socket from said peripheral wall; and said latch fingers on said fitting having latch finger end portions receivable in an external circumferential groove of an electrical nonmetallic tube that is receivable in said electrical nonmetallic tubing socket on said fitting.

5. The fitting of claim 4 including an inwardly extending circumferential divider between said male and female end portions; said male end portion being configured for locking reception within a first size electrical nonmetallic tubing socket; and said electrical nonmetallic tubing socket in said female end portion being configured for locking reception of a second size electrical nonmetallic tube therein that is at least one size smaller than said first size.

6. The fitting of claim 1 wherein said male and female end portions have generally cylindrical inner surfaces and said inner surface of said male end portion has a smaller diameter than said inner surface of said female end portion.

7. Apparatus for transitioning from an existing electrical nonmetallic tubing socket to a smaller electrical nonmetallic tubing socket, said apparatus comprising:
   a reducer fitting having generally cylindrical male and female opposite end portions;
   said male end portion having a cylindrical outer surface and a terminal end;
   a shoulder extending outwardly from said outer surface between said male and female end portions;
   a pair of axially-spaced first and second circumferential projections extending outwardly from said outer surface of said male end portion intermediate said terminal end and said shoulder;

said second projection being located between said first projection and said shoulder;

at least said second projection having a sloping cam surface that slopes outwardly from said outer surface in a direction away from said terminal end;

said female end portion having a generally cylindrical electrical nonmetallic tubing socket with a peripheral wall;

resilient latch fingers projecting into said electrical nonmetallic tubing socket from said peripheral wall and having latch finger end portions receivable in an external circumferential groove of an electrical nonmetallic tube that is receivable in said electrical nonmetallic tubing socket;

an inwardly extending circumferential divider between said male and female end portions;

said male end portion being configured for locking reception within a first size electrical nonmetallic tubing socket; and said electrical nonmetallic tubing socket in said female end portion being configured for locking reception of a second size electrical nonmetallic tube therein that is at least one size smaller than said first size.

8. The fitting of claim 7 wherein both of said circumferential projections on said outer surface of said male end portion have the same configuration and size.

9. Apparatus for transitioning from an existing nonmetallic tubing socket to a smaller electrical nonmetallic tubing socket, said apparatus comprising:

a reducer fitting having generally cylindrical male and female opposite end portions;

said male end portion having a cylindrical outer surface and a terminal end;

a shoulder extending outwardly from said outer surface between said male and female end portions;

a circumferential projection extending outwardly from said outer surface of said male end portion intermediate said terminal end and said shoulder;

said projection having a sloping cam surface that slopes outwardly from said outer surface in a direction away from said terminal end;

said female end portion having a generally cylindrical electrical nonmetallic tubing socket with a peripheral wall;

resilient latch fingers projecting into said electrical nonmetallic tubing socket from said peripheral wall and having latch finger end portions receivable in an external circumferential groove of an electrical nonmetallic tube that is receivable in said electrical nonmetallic tubing socket;

an inwardly extending circumferential divider between said male and female end portions;

said male end portion being configured for locking reception within a first size electrical nonmetallic tubing socket; and said electrical nonmetallic tubing socket in said female end portion being configured for locking reception of a second size electrical nonmetallic tube therein that is at least one size smaller than said first size.

10. The fitting of claim 9 wherein said male and female end portions have generally cylindrical inner surfaces and said inner surface of said male end portion has a smaller diameter than said inner surface of said female end portion.

11. The fitting of claim 9 wherein said circumferential projection is located closer to said terminal end than to said shoulder.

12. The fitting of claim 9 wherein said divider has a radial surface aligned with said shoulder.

13. The fitting of claim 9 wherein said cam surface is inclined at 45° to said outer surface of said male end portion.

14. The fitting of claim 9 wherein said projection has a cylindrical projection outer surface and a radially extending surface that faces toward said shoulder.

15. The fitting of claim 14 wherein said projection outer surface is at least 0.025 inches wide.

16. The fitting of claim 9 wherein said projection extends at least 0.045 inches outwardly from said cylindrical outer surface of said male end portion.

* * * * *